Figure 1:
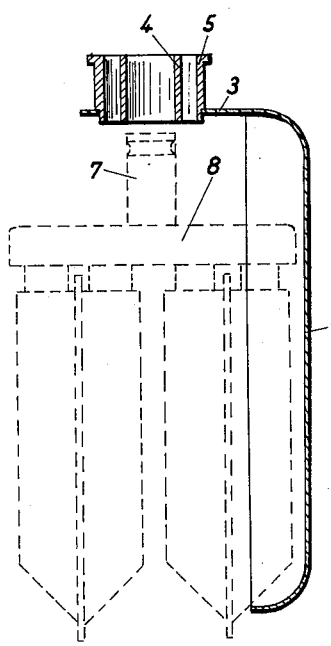

Oct. 1, 1957 W. LUCKE ET AL 2,807,959

GAS METER WITH SECTIONAL CASING

Filed Nov. 17, 1954

Inventors: Werner Lucke
Franz Kings

A
United States Patent Office 2,807,959
Patented Oct. 1, 1957

2,807,959

GAS METER WITH SECTIONAL CASING

Werner Lucke, Osnabruck, and Franz Rings, near Osnabruck, Germany, assignors to G. Kromschröder Aktiengesellschaft, Osnabruck, Germany Application November 17, 1954, Serial No. 469,362

Claims priority, application Germany November 18, 1953

3 Claims. (Cl. 73—274)

The present invention relates to the design of a sectional casing for gas meters.

While up to now two connecting sockets were provided at the gas meter casing, the object of the present invention covers a gas meter casing having a joint connecting socket for inlet and outlet disposed in the center of the upper face of the casing. In this case, the inlet and outlet openings can be so arranged that they lie either concentrically in each other or closely besides each other in such a manner that both the inlet and the outlet opening fall into a joint connecting socket. Such a design providing the possibility for central connection of the meter to the piping system offers great advantages in mounting and installation, however, a special structural set up of the meter being required in which the measuring mechanism is connected to the centrally disposed connecting socket of the gas meter casing through a joining sleeve. Introducing the joining sleeve into the connecting socket of the casing, which can only be effected from below, necessitates an enlargement of the casing, provided the casing cannot be divided on a horizontal plane. On the other hand, due to the relative great depth of the parts of the casing which can hardly be deep drawn from one piece of material, there arise certain difficulties in the manufacture when the casing shall be divided horizontally.

To avoid such an enlargement of the casing in case of a centrally arranged connecting socket, according to the present invention the division of the casing is effected on a vertical or diagonal plane, so that one part of the casing contains the connecting socket, while the other part of the casing comprises the substantial part of the bottom of the casing.

Two embodiments of the invention are illustrated in the accompanying drawings.

Figure 3:
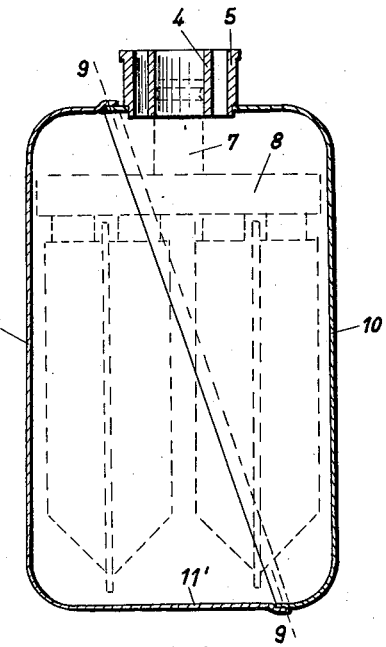
Figure 2:
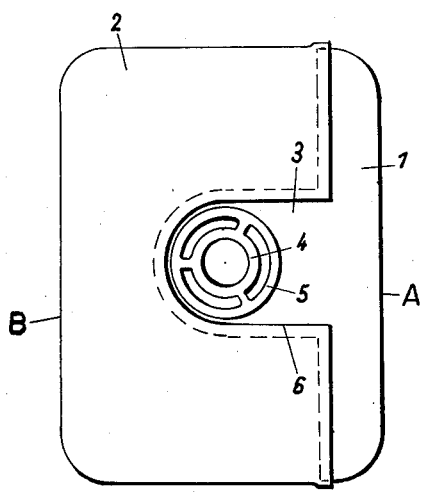
Figure 4:
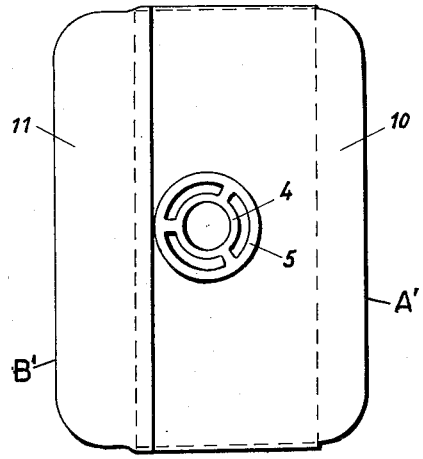

In the drawings:

Figs. 1 and 2 represent a gas meter casing having a vertical plane of division, while Figs. 3 and 4 show a gas meter casing divided on a diagonal plane.

In the first of the embodiments of the present invention, the casing is comprised of a more shallow part 1 and a deeper part 2. The more shallow part 1 has a tongue shaped projection 3 extending over the center of the upper face of the casing, the tongue shaped projection 3 carrying two connecting sockets 4, 5 which are arranged concentrically to each other. The tongue shaped projection 3 covers a corresponding recess 6 of the deeper part of the casing 2. Thereby, that the central connecting sockets 4, 5 are disposed on the projecting tongue 3 of the flat part of the casing 1, a joining sleeve 7 of the measuring mechanism 8 can be introduced from below into the connecting socket 4 without the necessity of being tilted. The length of the parts of the casing 1, 2 only needs to be so dimensioned that the measuring mechanism 8, with the joining sleeve 7 already introduced, is enclosed by the two parts of the casing. The bottom of the casing is formed by the deeper part of the casing 2 which is only attached to the part 1 after the joining sleeve 7 has been introduced.

With the embodiment illustrated in the Figs. 3 and 4, two parts of the casing 10, 11 are provided which are connected with each other on a plane 9 having approximately diagonal direction. The part of the casing 10 forms the upper face of the casing and carries the central connecting sockets 4, 5, while the part of the casing 11 comprising the bottom of the casing 11' is only attached after the joining sleeve 7 of the measuring mechanism 8 has already been introduced from below into the connecting socket 4.

In Figs. 1 and 2, one broad side of casing part 1 is indicated by A and a second parallel broad side B is that of casing part 2. Similarly, in Figs. 3 and 4, A' is a broad side of 10 and B' is a broad side of 11. In each case, the vertical dimension of the complete casing is greater than its width measured either in a lateral direction normal to a broad side or in a lateral direction parallel to a broad side.

We claim:

1. A gas meter casing comprising first and second cupped parts together forming a complete vertically disposed casing having a height greater than width in either lateral direction, said first part constituting one entire broad side of said casing and portions of the top and of the sides thereof adjacent said broad side, said second part constituting the entire second broad side opposite said one broad side of said casing and substantially all of the bottom and portions of the sides and of the top thereof adjacent said second broad side, a joint gas inlet and outlet fitting mounted in the portion of said first part constituting a portion of the top of said casing, said fitting being adapted to receive a joining sleeve from below to connect a meter mechanism with said fitting.

2. A gas meter casing in accordance with claim 1 wherein the portions of the first casing part constituting portions of the sides of said casing comprise flanges of substantially uniform depth throughout the height of said casing and the portion constituting a portion of the top of said casing comprises a tongue-like projection extending laterally from the portion of said first part constituting one broad side of said casing.

3. A gas meter casing in accordance with claim 1 wherein the portion of the first casing part constituting a portion of the top of the casing forms the major part of the top of the casing and the portions of said first part constituting portions of the sides of said casing comprise flanges increasing in depth from a minimum at the bottom of the casing to a maximum at the top thereof.

References Cited in the file of this patent

UNITED STATES PATENTS

| | | |
|---|---|---|
| 409,275 | Culmer | Aug. 20, 1889 |
| 587,125 | Kennedy | July 27, 1897 |
| 1,421,138 | Anderson | June 27, 1927 |
| 1,738,191 | Macleay | Dec. 3, 1929 |

FOREIGN PATENTS

| | | |
|---|---|---|
| 383,820 | Germany | Oct. 18, 1923 |
| 493,053 | Germany | June 12, 1930 |